(12) United States Patent
Pfister et al.

(10) Patent No.: US 10,680,955 B2
(45) Date of Patent: Jun. 9, 2020

(54) STATELESS AND RELIABLE LOAD BALANCING USING SEGMENT ROUTING AND TCP TIMESTAMPS

(71) Applicant: Cisco Technology, Inc., San Jose, CA (US)

(72) Inventors: Pierre Pfister, Chalons-en-Champagne (FR); William Mark Townsley, Paris (FR); Benoît Pit-Claudel, Montrouge (FR); Aloÿs Christophe Augustin, Paris (FR); Yoann Desmouceaux, Paris (FR)

(73) Assignee: Cisco Technology, Inc., San Jose, CA (US)

( * ) Notice: Subject to any disclaimer, the term of this patent is extended or adjusted under 35 U.S.C. 154(b) by 29 days.

(21) Appl. No.: 16/037,884

(22) Filed: Jul. 17, 2018

(65) Prior Publication Data
US 2019/0394131 A1      Dec. 26, 2019

Related U.S. Application Data

(60) Provisional application No. 62/687,584, filed on Jun. 20, 2018.

(51) Int. Cl.
| | |
|---|---|
| *H04L 12/803* | (2013.01) |
| *H04L 12/819* | (2013.01) |
| *H04L 12/801* | (2013.01) |
| *H04L 29/08* | (2006.01) |
| *H04L 29/06* | (2006.01) |
| *H04L 12/743* | (2013.01) |

(52) U.S. Cl.
CPC ........ *H04L 47/125* (2013.01); *H04L 45/7453* (2013.01); *H04L 47/13* (2013.01); *H04L 47/21* (2013.01); *H04L 67/1023* (2013.01); *H04L 67/1029* (2013.01); *H04L 69/16* (2013.01); *H04L 69/22* (2013.01)

(58) Field of Classification Search
CPC ............. H04L 67/1038; H04L 67/1002; H04L 67/288; H04L 67/1008; H04L 29/06; H04L 45/72; H04L 43/04; H04L 43/062; H04L 63/1425; H04L 63/1408; H04L 63/02; H04L 29/08; H04L 12/26
USPC ........................................................ 370/235
See application file for complete search history.

(56) References Cited

U.S. PATENT DOCUMENTS 9,432,245 B1 * 8/2016 Sorenson, III ........ H04L 47/125
9,461,922 B2 * 10/2016 Mason .................... H04L 47/21
(Continued)

OTHER PUBLICATIONS

Otteanu, Vladimir, Alexandru Agache, Andrei Voinescu, and Costin Raiciu. "Stateless datacenter load-balancing with beamer." In 15th Usenix Symposium on Networked Systems Design and Implementation (NSDI), vol. 18, pp. 125-139. 2018.

*Primary Examiner* — Man U Phan
(74) *Attorney, Agent, or Firm* — Merchant & Gould P.C.

(57) ABSTRACT

Stateless and reliable load balancing using segment routing and an available side-channel may be provided. First, a non-SYN packet associated with a connection may be received. The non-SYN packet may have first data contained in an available side-channel. Next an associated bucket may be retrieved based on a hash of second data in the non-SYN packet. The associated bucket may identify a plurality of servers. Then a one of the plurality of servers may be selected based on the first data contained in the available side-channel.

20 Claims, 2 Drawing Sheets

(56) References Cited

U.S. PATENT DOCUMENTS

| | | | |
|---|---|---|---|
| 9,639,553 B2 | 5/2017 | Hall et al. | |
| 10,034,210 B2* | 7/2018 | Hara | H04W 36/10 |
| 10,069,903 B2* | 9/2018 | Sorenson, III | H04L 67/1038 |
| 10,158,573 B1* | 12/2018 | Lee | H04L 47/125 |
| 10,313,231 B1* | 6/2019 | Bosshart | H04L 69/325 |
| 10,320,683 B2* | 6/2019 | Pfister | H04L 69/22 |
| 10,432,709 B2* | 10/2019 | Chang | H04L 67/1008 |
| 2004/0098499 A1* | 5/2004 | Tamai | H04L 67/1008 709/232 |
| 2015/0117216 A1* | 4/2015 | Anand | H04L 47/125 370/236 |
| 2015/0189009 A1* | 7/2015 | van Bemmel | H04L 67/141 709/226 |
| 2017/0013508 A1 | 1/2017 | Pallas | |

* cited by examiner

STATELESS AND RELIABLE LOAD BALANCING USING SEGMENT ROUTING AND TCP TIMESTAMPS

RELATED APPLICATION

Under the provisions of 35 U.S.C. § 119(e), Applicant claims the benefit of U.S. Provisional Application No. 62/687,584 filed Jun. 20, 2018, which is incorporated herein by reference.

TECHNICAL FIELD

The present disclosure relates generally to load-balancing.

BACKGROUND

The ubiquity of Internet-enabled devices has created an enormous demand for Internet services and content. This Internet-connected revolution has created significant challenges for service and content providers who often struggle to service a high volume of user requests without falling short of user performance expectations. For example, providers typically need large and complex datacenters to keep up with network and content demands from users. These datacenters are generally equipped with server farms configured to host specific services, and include numerous switches and routers configured to route traffic in and out of the datacenters.

Not surprisingly, such large volumes of data can be difficult to manage and create significant performance degradations and challenges. Load-balancing solutions may be implemented to improve performance and service reliability in a datacenter.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

In some embodiments, stateless and reliable load balancing using segment routing and an available side-channel may be provided. First, a non-SYN packet associated with a connection may be received. The non-SYN packet may have first data contained in an available side-channel. Next an associated bucket may be retrieved based on a hash of second data in the non-SYN packet. The associated bucket may identify a plurality of servers. Then one of the plurality of servers may be selected based on the first data contained in the available side-channel.

Both the foregoing overview and the following example embodiments are examples and explanatory only, and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Load-balancers play a role in any medium or large scale information technology (IT) deployment. Many variants of load balancers may be used depending on the needs, from cloud infrastructures, to large scale data-centers, or from network layer load balancers, to application layer load balancers. These load balancers may implement the following functionalities: i) back-end selection—selecting a server or a network path when a new flow is received (e.g., using flow hashing, round-robin, or server monitoring); and ii) connection affinity—ensuring that once established, a connection may go to the same selected server (e.g., using a flow-table or consistent hashing).

Basic load balancers may use flow hashing in order to implement both functionalities. Since this approach may not require state to be kept, it may be implementable in hardware, but may not provide sufficiently reliable connection affinity (e.g., in case of server changes). As a consequence, data center infrastructures may rely on software-based Layer-3 (L3)/Layer-4 (L4) load balancers. Although those may have a lower throughput than hardware-based load balancers, they may not suffer from the same table-lookup size limitations.

Embodiments of the disclosure may provide a Transmission Control Protocol (TCP) load balancer that may be implemented, for example, in routers (e.g., Data Center (DC) ingress) and switches (e.g., Top-of-Rack (TOR) switches) without requiring any per-flow state to be maintained, while providing a high level of connection affinity reliability. Furthermore, embodiments of the disclosure may detect when long lived flows are about to lose connection affinity, such as to transition to a stateful mode for those specific flows.

Figure 1:
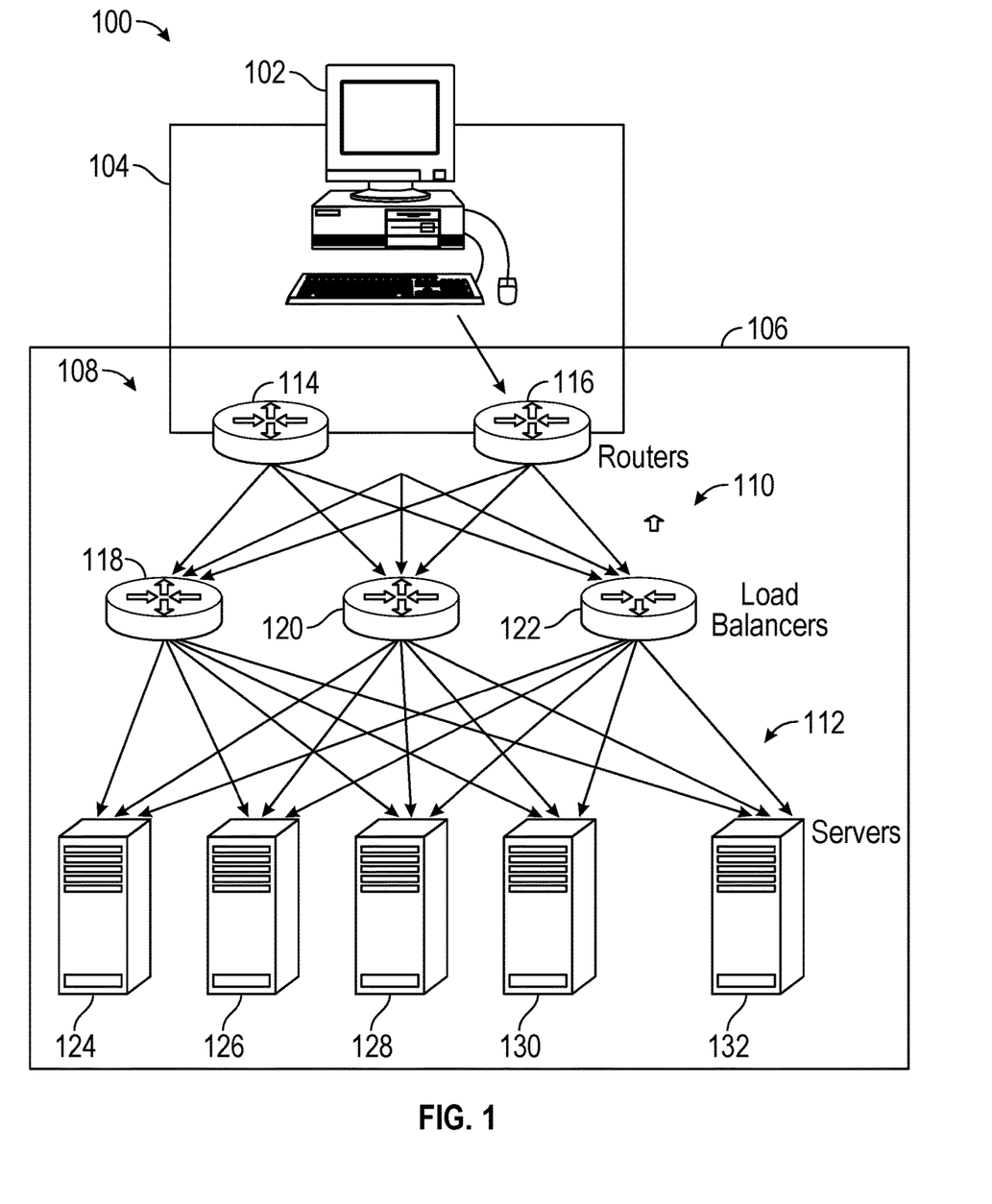
FIG. 1 is a block diagram of a network environment.

FIG. 1 is a block diagram of a network environment 100. As shown in FIG. 1, network environment 100 may comprise a client 102, a network 104, and a data center 106. Data center 106 may comprise a plurality of routers 108, a plurality of load balancers 110, and a plurality of servers 112. Plurality of routers 108 may comprise a first router 114 and a second router 116. Plurality of load balancers 110 may comprise a first load balancer 118, a second load balancer 120, and a third load balancer 122. Plurality of servers 112 may comprise a first server 124, a second server 126, a third server 128, a fourth server 130, and a fifth server 132.

Data center 106 may represent one or more data centers and/or networks. For example, data center 106 may be a single data center or may include multiple of data centers. Data center 106 may be physically located in a same geographic location or distributed throughout multiple locations. Moreover, data center 106 may include forwarder-side and server-side architectures or components.

Client 102 may connect with plurality of routers 108 in data center 106 via network 104. Client 102 may be any computing device, such as a laptop, a desktop, a tablet computer, a mobile phone, a server, a smart device (e.g., smart television, smart watch, etc.), an Internet-of-Things (IoT) device, a remote network or data center, etc. Additionally, network 104 may include any number or type of networks, such as a private network (e.g., local area network), a public network (e.g., the Internet), a hybrid network (e.g., virtual private network), a cloud network, etc.

Plurality of routers 108 may serve as edge devices in data center 106, and route traffic to and from data center 106. Thus, plurality of routers 108 may connect data center 106 with network 104, client 102, and any other external networks or devices. Plurality of routers 108 may serve as egress and ingress points for data center 106. Plurality of routers 108 may also route traffic internally within data center 106 to other routers or switches, network devices or services (e.g., appliances, firewalls, load-balancers, etc.), and plurality of servers 112 in data center 106.

Plurality of servers 112 may include physical machines or resources hosting applications, isolated environments, or services in data center 106. For example, plurality of servers 112 may be physical servers running various applications in data center 106. Plurality of servers 112 may run some or all of their applications in isolated environments, such as in Virtual Machines (VMs) or software containers. In some cases, an application may be hosted by, and/or run on, multiple servers in data center 106. For example, plurality of servers 112 may run instances of an application (e.g., virtual instances, replicas, parallel instances, mirror instances, etc.). For example, an application may run on multiple servers to allow plurality of servers 112 to load-balance application traffic, and/or provide redundancy (e.g., backup or standby), fault-tolerance, high-availability, scalability, etc., for the application. Plurality of servers 112 may run a full application or instance of the application, or a portion of the application, such as a function in a service chain configuration.

Plurality of servers 112 may include a physical network interface (e.g., a Network Interface Card (NIC)) to communicate with other devices or services (e.g., devices or services in the network environment 100). The physical network interface can be assigned a physical prefix or network address for such communications. Plurality of servers 112 may also include one or more virtual interfaces (e.g., vNICs) that may provide virtualized or abstract representations of network interfaces and connections. Virtual interfaces may provide added flexibility and network capabilities, as well as various other benefits or services, such as aggregation of links or data, isolation of data or networks, decoupling of application and system traffic, expansion of network interfaces, network redundancy, dedicated links, and so forth. Virtual interfaces may be assigned virtual addresses (e.g., virtual Internet Protocol (vIP) addresses) in data center 106. The virtual addresses may identify the virtual interfaces as well as any applications or isolated environments associated with the virtual addresses on plurality of servers 112.

For example, an application may be assigned a virtual address in data center 106 that may be used to identify the application in data center 106 and route traffic to and from the application. The virtual address may be used to steer traffic to and from a virtual instance of the application running on one or more of plurality of servers 112. In some cases, the virtual address may be mapped to the same application on multiple ones of plurality of servers 112, and may be used to communicate with an instance of the application on any of plurality of servers 112.

Plurality of servers 112 may include a virtual switch that may route traffic to and from plurality of servers 112. For example, a virtual switch may route traffic between physical and virtual network interfaces on an application server, between applications and/or isolated environments on the application server, and between the application server and devices or applications outside of the application server. For example, an application server may run multiple workloads, such as, applications in different virtual machines or containers, assigned to different virtual interfaces and virtual addresses. A virtual switch on the application server may route traffic to and from different workloads by translating the virtual addresses of the workloads and communicating with the virtual interfaces as well as other network interfaces such as the physical network interface(s) on the application server.

Plurality of load balancers 110 may communicate traffic between plurality of routers 108 and plurality of servers 112. Moreover, plurality of load balancers 110 may provide load-balancing and forwarding services for traffic associated with plurality of servers 112. Plurality of load balancers 110 may select plurality of servers 112 for a given flow to distribute flows and loads between plurality of servers 112 and steer traffic accordingly. As discussed in further detail below, plurality of servers 112 may steer traffic flows based on sequence number identification information contained in packet-header information for packets received from client 102.

The elements of network environment 100 may be practiced in hardware and/or in software (including firmware, resident software, micro-code, etc.) or in any other circuits or systems. The elements of network environment 100 may be practiced in electrical circuits comprising discrete electronic elements, packaged or integrated electronic chips containing logic gates, a circuit utilizing a microprocessor, or on a single chip containing electronic elements or microprocessors. Furthermore, elements of network environment 100 may also be practiced using other technologies capable of performing logical operations such as, for example, AND, OR, and NOT, including but not limited to, mechanical, optical, fluidic, and quantum technologies. As described in greater detail below with respect to FIG. 3, elements of network environment 100 may be practiced in a computing device 300.

Embodiments of the disclosure may use a TCP Timestamp (TS) as an available side-channel for stateless and reliable load balancing for example. The TCP TS option was defined in Request for Comments (RFC) 1323 and updated by RFC7323. TCP TSs may be useful for Round Trip Time (RTT) measurements and to avoid sequence wrapping in networks with high Capacity*Delay product. TCP TSs may be supported in most operating systems and may be included in packets of a connection (e.g., if negotiated at connection establishment).

The TCP TS values may be encoded, for example, as 4 byte integers (i.e., 32 bits) with clock frequencies that may depend on the implementation (e.g., from 1 s to 59 ns per tick). TCP TSs may be chosen by each peer and echoed-back by the other peer. It may therefore possible to use the lower-order bits of the TS such that packets sent back by clients may have a value in them that was chosen by a server.

Embodiments of the disclosure may use the TCP TS low-order bits in order to encode a per-flow index that may be chosen by a load balancer for each new connection. This may be done, for example, in two different ways: i) by modifying the server TCP stack so as to encode the given index in the lower-order bits of the TS field, while using the remaining bits to encode the timestamp; and ii) as a bump in the wire functionality close to the server (e.g., ToR switch, virtual switch). From the client's perspective, it may looks like the server may be using a less accurate clock that may set the lower-order bits to the same value, but this behavior may be legitimate because the clock may still be correctly paced and monotonic.

When a packet sent by a client is received by a load balancer, it may need to be dispatched to one of the servers. The server selection functionality may be used for packets corresponding to a new connection request, but when the packet corresponds to an existing connection, the load balancer may make sure it goes to the same server as the one that was previously selected. This may be referred to as session/connection affinity.

In order to implement session affinity, load balancers may extract, for example, the connection 5-tuple (source (SRC) address, destination (DST) address, protocol, SRC port, DST port). This 5-tuple may then be either: i) Looked-up in a flow table (stateful load-balancer); or ii) Hashed and used to retrieve a server from a consistent hashing table (stateless load-balancer). The first process provides reliable connection affinity, but may require a large table to store the flows 5-tuple, and may therefore be subject to Distributed Denial-of-Service (DDoS) attacks. The second process may be implemented in hardware, but may not be as reliable when the set of servers changes. Some load balancers combine these two processes in order to provide reliable connection affinity, falling back to stateless mode when the flow-table is full.

Beamer makes a different trade-off by bouncing packets that are not sent to the right server to the previously used server. Conceptually, the trade-off consists in getting rid of the state in the load balancer and leverage state that is kept at the servers, which may cause a portion of the traffic to go through two servers instead of a single one.

Stateless connection affinity and optimal routing may be performed if the packets received from clients contain enough information to statelessly determine which server accepted a given connection. Embodiments of the disclosure may leverage an available side-channel (e.g., the TCP TS lower-order bits, picked by the servers and echoed back by the clients in order) to let the load-balancer statelessly determine which server had accepted a connection.

Embodiments of the disclosure may combine the use of a consistent-hashing table, as described above, with the use of a side channel (e.g., the TCP TS field) in order to disambiguate which server owns a given connection. In other words, the few bits of information that are put in the TCP TS field may be combined with the flow-hash bits and the load balance history to increase the efficiency of the disambiguation process.

For example, consider a Beamer load balancer with a consistent-hashing table of 1024 buckets. When a non-SYN packet arrives, the five tuple may be hashed modulo 1024 to retrieve its associated bucket. A non-SYN packet may comprise a packet that is not a SYN packet (e.g., a SYN packet may be used in establishing a connection). In Beamer, the associated bucket contains the currently used server (for new connections) as well as the server that was used in the past for this same bucket (if it ever changed). The packet is then sent to the first server in the bucket, with an in-band indication (an IP option in the case of Beamer) that tells the server where to send the packet in case it does not have local state for the given connection.

In the above example, embodiments of the disclosure may be used in order to disambiguate which of the two servers the packet should go to by looking at the TCP TS value lower-order bits. In this case, using a single bit may be enough to disambiguate between the two potential servers. However, embodiments of the disclosure may take advantage of using more bits (e.g., 2 to 4) in the TCP TS field:

i) By keeping more history of servers used for each bucket, the load balancer may be able to statelessly balance flows that are older. For that purpose, an efficient consistent hashing algorithm may be used that may make this load balancer stateless Connection Affinity resilient to servers changes.

ii) The number of potential candidate servers may be increased in order to improve the server selection process. A SYN packet may be sent to two candidate servers. TCP TS based disambiguation may be used in order to statelessly steer subsequent packets that have been accepted by one server or the other.

Embodiments of the disclosure may be implemented in hardware. Server selection may not be modified. Packets corresponding to new flows (SYN packets) may be steered to a set of candidate servers (one or more). Each of those candidates in the set may also be associated with a value of the "expected TS low-order bits", which may be communicated to the server as described below. These "expected TS low-order bits" may be chosen by the control plane to minimize the size of the history associated to each TS.

Other packets may be steered using a slightly modified consistent hashing table where each bucket contains p sub-tables, where p is the number of values that may be encoded in the TCP TS field. Each of these sub-tables may contain a list of servers corresponding to the history of retained servers for a given bucket and TCP TS low-order bits value.

Figure 2:
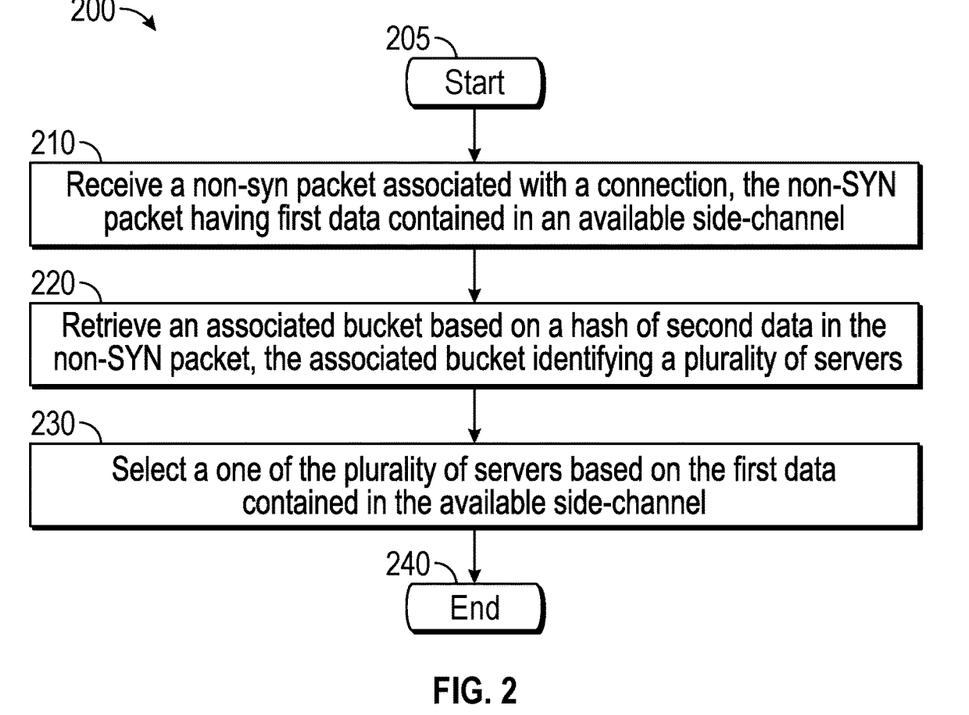
FIG. 2 is a flow chart of a method for providing load balancing using segment routing and a side-channel.

FIG. 2 is a flow chart setting forth the general stages involved in a method 200 consistent with an embodiment of the disclosure for providing load balancing using segment routing and a side-channel. Method 200 may be implemented using a load balancer (e.g., first load balancer 118) as described in more detail above with respect to FIG. 1. Ways to implement the stages of method 200 will be described in greater detail below.

Method 200 may begin at starting block 205 and proceed to stage 210 where first load balancer 118 may receive a non-SYN packet associated with a connection from client 102. The non-SYN packet may have first data contained in an available side-channel. For example, the available side-channel may comprise a Transmission Control Protocol (TCP) Time Stamp (TS) and the first data may comprise a value in lower-order bits of the TCP TS as described above.

From stage 210, where first load balancer 118 receives the non-SYN packet associated with the connection, method 200 may advance to stage 220 where first load balancer 118 may retrieve an associated bucket based on a hash of second data in the non-SYN packet. The associated bucket may identify a plurality of servers. For example, the second data comprises a 5-tuple of the connection. The 5-tuple may comprise, for example, a source address, a destination address, a protocol, a source port, and a destination port.

Once first load balancer 118 retrieves the associated bucket based on the hash of the second data in the non-SYN packet in stage 220, method 200 may continue to stage 230 where first load balancer 118 may select a one of the plurality of servers based on the first data contained in the available side-channel. For example, a sub-table corresponding to the associated bucket may be identified based on the first data and the one of the plurality of servers identified in the sub-table may be selected. The one of the plurality of servers may comprise one of plurality of servers 112. The non-SYN packet may then be sent to the one of the plurality of servers.

In other words, when a packet for an existing flow is received, its flow hash may be computed, so as to retrieve the consistent hashing bucket. The value stored, for example, in the TCP TS field may be used to retrieve the appropriate sub-table. If the sub-table only contains a single server address, the packet may be sent to that server alone. Once first load balancer 118 selects the one of the plurality of servers based on the first data contained in the available side-channel in stage 230, method 200 may then end at stage 240.

In-Band per-flow signaling may be used by embodiments of the disclosure. For example, embodiments of the disclosure may use Segment Routing (SR) to allow a load balancer to tell servers which TCP timestamp lower-order bits to use on a per-connection basis. The number of bits used inside the TCP timestamp may be configured before-hand. Then, when a SYN packet is received by the load balancer, it may be encapsulated in an IPv6 SR packet to steer it towards the server (or the set of candidate servers) that should accept the connection. Bits from the IPv6 SR Segment Identifier (SID) may then be set to the value that the server is supposed to use in its TCP TS lower-order bits for subsequent packets. Generic Routing Encapsulation (GRE) may also be used by leveraging the 32 bit 'key' field to encode both TCP TS low-order bits and the 'next server' ID.

The following is a use case providing an example of embodiments of the disclosure. In this example, there may be four servers s1, s2, s3, and s4 (e.g., first server 124, second server 126, third server 128, and fourth server 130) that we may encode p=3 values in the TS field, that we steer connections to two candidate servers, and that the consistent hashing table for one given bucket of interest may have the following history shown in Table 1:

TABLE 1

| Time (in "reconfiguration of backend pool" units) | Candidate 1 for SYN | Candidate 2 for SYN |
| --- | --- | --- |
| t   | s1 | s2 |
| t-1 | s2 | s3 |
| t-2 | s4 | s3 |
| t-3 | s3 | s2 |

A possible assignment of TS bits by the control plane that incurs a low history for each value of TS may comprise as shown in Table 2:

TABLE 2

| Time (in "reconfiguration of backend pool" units) | Candidate 1 for SYN | Candidate 2 for SYN |
| --- | --- | --- |
| t   | s1 (TS = 2) | s2 (TS = 1) |
| t-1 | s2 (TS = 1) | s3 (TS = 0) |
| t-2 | s4 (TS = 2) | s3 (TS = 0) |
| t-3 | s3 (TS = 0) | s2 (TS = 1) |

Then, for this bucket of interest, the modified lookup table for non-SYN packets may contain, for each value of TS, the history of those servers that were once assigned to TS as shown in Table 3.

TABLE 3

| TS value received in packet | Candidates for non-SYN |
| --- | --- |
| TS = 0 | {s3} |
| TS = 1 | {s2} |
| TS = 2 | {s1, s4} |

In this example, the list of candidates may have length one for TS=0, TS=1, and length two for TS=2, in which case packets for connections opened two epochs ago and which were destined to s4 will be rerouted through s1 before reaching s4. The only packets that may endure suboptimal routing correspond to very long-lived connections (for which two reconfigurations of the backend pool have happened—these reconfigurations are not frequent), and therefore only a very small fraction of the packets may be affected. Beamer does not support more than one level of history for backend reconfigurations, and therefore would have dropped those connections.

Embodiments of the disclosure may provide long-lived flow detection. For example, embodiments of the disclosure may also be used to increase connection-affinity reliability over existing load balancers. Long-lived connections in case of high server churn, however, might end up being reset. Accordingly, embodiments of the disclosure may include a small flow-table used for long-lived flows.

In order to detect which flows are at risk, the load balancer may detect when the server in charge of a flow is getting near the history limit, which may mean a further change in the set of servers may cause the server to be forgotten by the load balancer). When that happens, a flow-table entry may be installed in the load balancer.

In order to detect such a situation, the server may look at received packets to see if it is one of the last servers in the list of potential servers. If so, it may send a packet to the load balancer in order to request for state to be created in the load balancer flow table.

The aforementioned example focused on the use of the TCP TS field as an available side-channel. However, the same approach may be used with any other side-channel offering a way for the load-balancer to extract, on a per packet basis, a value that would have been set by the server (or an agent close-by). Accordingly, embodiments of the disclosure are not limited to using of the TCP TS field as an available side-channel.

Embodiments of the disclosure may use TCP TS lower-order bits, set by servers and echoed back by clients, in order to implement stateless and reliable load-balancing and optimal routing, even in presence of server churn. When a packet is received by a load balancer, it may steer the packet to the set of servers that may be likely to own the connection, determined by looking at both the 5-tuple hash, the TCP TS, and the history of the flow-hash table. By using an appropriate consistent hashing process, this list may be likely to be restricted to a single candidate (while Beamer will often have multiple options), which may provide optimal routing. When a small flow-table is available in load-balancers, servers receiving packets in a non-optimal way may send packets back to the load balancer, such as to inform it that non-optimal routing occurred. The load balancer may then decide, based on the number of sub-optimal hops as well as the likelihood of the server entry to be eventually removed from the history, to create a stateful entry for the given flow.

Figure 3:
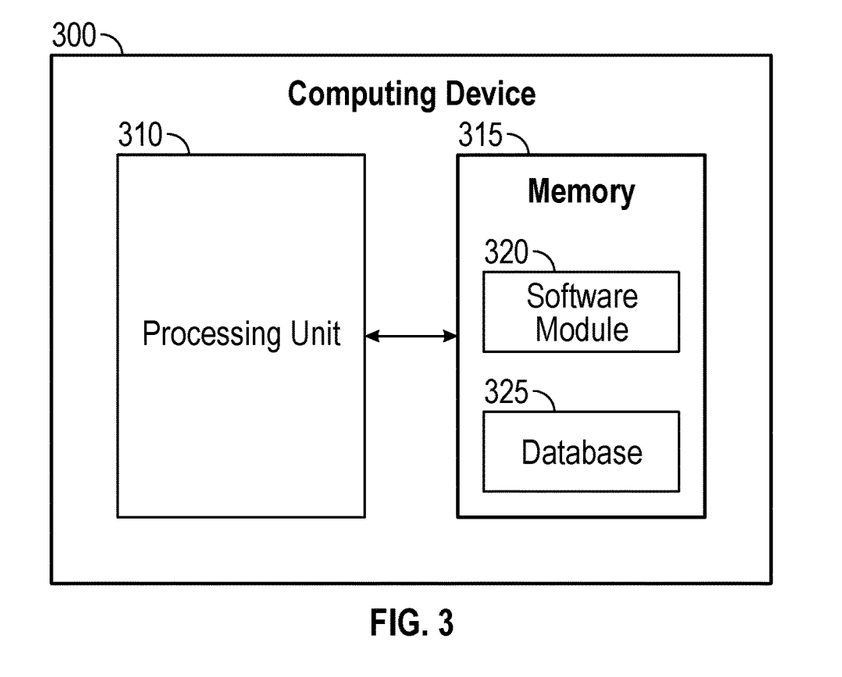
FIG. 3 is a block diagram of a computing device.

FIG. 3 shows computing device 300. As shown in FIG. 3, computing device 300 may include a processing unit 310 and a memory unit 315. Memory unit 315 may include a software module 320 and a database 325. While executing on processing unit 310, software module 320 may perform, for example, processes for providing load balancing using segment routing and a side-channel, as described above with respect to FIG. 2. Computing device 300, for example, may provide an operating environment for any of the elements shown in FIG. 1. The elements shown in FIG. 1 may operate in other environments and are not limited to computing device 300.

Computing device 300 may be implemented using a Wireless Fidelity (Wi-Fi) access point, a cellular base station, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay devices, or other similar microcomputer-based device. Computing device 300 may comprise any computer operating environment, such as hand-held devices, multiprocessor systems, microprocessor-based or programmable sender electronic devices, minicomputers, mainframe computers, and the like. Computing device 300 may also be practiced in distributed computing environments where tasks are performed by remote processing devices. The aforementioned systems and devices are examples and computing device 300 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 300 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
   receiving a non-SYN packet associated with a connection, the non-SYN packet having first data contained in an available side-channel;
   retrieving an associated bucket based on a hash of second data in the non-SYN packet, the associated bucket identifying a plurality of servers;
   selecting a one of the plurality of servers based on the first data contained in the available side-channel;
   receiving a SYN-packet associated with the connection;

encapsulating the SYN-packet, wherein bits identifying a value to be used by the available side channel to identify the one of the plurality of servers are set in the encapsulation; and steering the encapsulated SYN-packet to the one of the plurality of servers.

2. The method of claim 1, wherein receiving the non-SYN packet having the first data contained in the available side-channel comprises receiving the non-SYN packet having the first data contained in the available side-channel wherein the available side-channel comprises a Transmission Control Protocol (TCP) Time Stamp (TS) and the first data comprises a value in lower-order bits of the TCP TS.

3. The method of claim 1, wherein retrieving the associated bucket based on the hash of the second data contained in the non-SYN packet, the associated bucket identifying the plurality of servers comprises retrieving the associated bucket wherein the plurality of servers comprise a currently used server and a past used server.

4. The method of claim 1, wherein selecting the one of the plurality of servers based on the first data contained in the available side-channel comprises:
identifying a sub-table corresponding to the associated bucket based on the first data; and
selecting the one of the plurality of servers identified in the sub-table.

5. The method of claim 1, further comprising performing the hash of the second data contained in the non-SYN packet.

6. The method of claim 1, further comprising performing the hash of the second data contained in the non-SYN packet wherein the second data comprises a 5-tuple of the connection, the 5-tuple comprising a source address, a destination address, a protocol, a source port, and a destination port.

7. The method of claim 1, further comprising sending the non-SYN packet to the one of the plurality of servers.

8. The method of claim 1, wherein encapsulating the SYN-packet comprises setting bits of an IPv6 Segment Routing (SR) Segment Identifier (SID) to the value.

9. A system comprising:
a memory storage; and
a processing unit coupled to the memory storage, wherein the processing unit is operative to:
receive a non-SYN packet associated with a connection, the non-SYN packet having first data contained in an available side-channel;
retrieve an associated bucket based on a hash of second data in the non-SYN packet, the associated bucket identifying a plurality of servers;
select a one of the plurality of servers based on the first data contained in the available side-channel;
receive a SYN-packet associated with the connection;
encapsulate the SYN-packet, wherein bits identifying a value to be used by the available side channel to identify the one of the plurality of servers are set in the encapsulation, and
steer the encapsulated SYN-packet to the one of the plurality of servers.

10. The system of claim 9, wherein the processing unit being operative to select the one of the plurality of servers based on the first data contained in the available side-channel comprises the processing unit being operative to:
identify a sub-table corresponding to the associated bucket based on the first data; and
select the one of the plurality of servers identified in the sub-table.

11. The system of claim 9, wherein the available side-channel comprises a Transmission Control Protocol (TCP) Time Stamp (TS) and the first data comprises a value in lower-order bits of the TCP TS.

12. The system of claim 9, wherein the processing unit is further operative to perform the hash of the second data contained in the non-SYN packet.

13. The system of claim 9, wherein the second data comprises a 5-tuple of the connection, the 5-tuple comprising a source address, a destination address, a protocol, a source port, and a destination port.

14. The system of claim 9, wherein the processing unit is further operative to send the non-SYN packet to the one of the plurality of servers.

15. A non-transitory computer-readable medium that stores a set of instructions, which when executed by a processor, cause one or more computing devices to:
receive a non-SYN packet associated with a connection, the non-SYN packet having first data contained in an available side-channel;
retrieve an associated bucket based on a hash of second data in the non-SYN packet, the associated bucket identifying a plurality of servers;
select a one of the plurality of servers based on the first data contained in the available side-channel;
receive a SYN-packet associated with the connection;
encapsulate the SYN-packet, wherein bits identifying a value to be used by the available side channel to identify the one of the plurality of servers are set in the encapsulation; and
steer the encapsulated SYN-packet to the one of the plurality of servers.

16. The non-transitory computer-readable medium of claim 15, wherein receiving the non-SYN packet having the first data contained in the available side-channel comprises receiving the non-SYN packet having the first data contained in the available side-channel wherein the available side-channel comprises a Transmission Control Protocol (TCP) Time Stamp (TS) and the first data comprises a value in lower-order bits of the TCP TS.

17. The non-transitory computer-readable medium of claim 15, wherein retrieving the associated bucket based on the hash of the second data contained in the non-SYN packet, the associated bucket identifying the plurality of servers comprises retrieving the associated bucket wherein the plurality of servers comprise a currently used server and a past used server.

18. The non-transitory computer-readable medium of claim 15, wherein selecting the one of the plurality of servers based on the first data contained in the available side-channel comprises:
identifying a sub-table corresponding to the associated bucket based on the first data; and
selecting the one of the plurality of servers identified in the sub-table.

19. The non-transitory computer-readable medium of claim 15, wherein the instructions, which when executed by the processor, further cause the one or more computing devices to perform the hash of the second data contained in the non-SYN packet wherein the second data comprises a 5-tuple of the connection, the 5-tuple comprising a source address, a destination address, a protocol, a source port, and a destination port.

20. The system of claim 9, wherein the processing unit being operative to encapsulate the SYN-packet comprises the processing unit being operative to set bits of an IPv6 Segment Routing (SR) Segment Identifier (SID) to the value.

* * * * *